(12) United States Patent
Kozato

(10) Patent No.: US 8,923,680 B2
(45) Date of Patent: Dec. 30, 2014

(54) OPTICAL MODULE AND SUBSTRATE MOUNTING THE SAME

(75) Inventor: Atsushi Kozato, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 13/399,135

(22) Filed: Feb. 17, 2012

(65) Prior Publication Data

US 2012/0213481 A1 Aug. 23, 2012

(30) Foreign Application Priority Data

Feb. 18, 2011 (JP) ................................. 2011-033168

(51) Int. Cl.
*G02B 6/00* (2006.01)
*G02B 6/42* (2006.01)

(52) U.S. Cl.
CPC .................................. *G02B 6/4201* (2013.01)
USPC ........................................................ 385/138

(58) Field of Classification Search
None
See application file for complete search history.

(56) References Cited

U.S. PATENT DOCUMENTS

| 5,099,399 A * | 3/1992 | Miller et al. .................. 362/580 |
| 5,436,997 A * | 7/1995 | Makiuchi et al. ............... 385/92 |
| 5,513,285 A * | 4/1996 | Kawashima et al. ........... 385/16 |
| 5,906,576 A * | 5/1999 | Upsher .......................... 600/178 |
| 6,477,053 B1 * | 11/2002 | Zeidan et al. ................. 361/719 |
| 7,070,340 B2 * | 7/2006 | Crane et al. ..................... 385/92 |
| 8,242,350 B2 * | 8/2012 | Cashion et al. ............... 136/246 |
| 2005/0231911 A1 * | 10/2005 | Furuyama et al. ........... 361/695 |
| 2013/0235449 A1 * | 9/2013 | Suzuki ........................ 359/341.1 |

FOREIGN PATENT DOCUMENTS

| JP | 7-35962 A | 2/1995 |
| JP | 2002-504737 A | 2/2002 |
| JP | 2003-179296 A | 6/2003 |
| JP | 2003-273438 A | 9/2003 |
| JP | 2004-037901 A | 2/2004 |
| JP | 2005-1 21 71 7 A | 5/2005 |
| JP | 2006-065017 A | 3/2006 |

OTHER PUBLICATIONS

Japanese Office Action for corresponding Application No. 2011-033168 issued Jul. 22, 2014.

* cited by examiner

*Primary Examiner* — Sung Pak
(74) *Attorney, Agent, or Firm* — Sughrue Mion, PLLC

(57) ABSTRACT

An optical module of the invention includes a chassis housing an optical element and having a hole that connects to an optical fiber, and a heat dissipation plate with a cutout part. The heat dissipation plate is arranged on an upper part of the chassis. The optical fiber passes through the cutout part.

11 Claims, 3 Drawing Sheets

OPTICAL MODULE AND SUBSTRATE MOUNTING THE SAME

This application is based upon and claims the benefit of priority from Japanese Patent Application No. 2009-235850, filed on Oct. 13, 2009, the disclosure of which is incorporated herein in its entirety by reference.

TECHNICAL FIELD

The invention is relates to an optical module and a substrate mounting the optical module which are used for optical communication.

BACKGROUND ART

An optical module used for optical communication includes an optical semiconductor element, which is contained in a package and optically connects to an optical fiber through an optical system. The optical semiconductor element operates when electric power is supplied, and transmits and receives a laser light though the optical system and the optical fiber.

In these days, an optical communication apparatus, like an optical amplifier or a light source for a signal each using the optical module, is requested to reduce mounting size of each optical module in order to reduce size of the apparatus.

Japanese Patent Laid-Open No. 2003-273438 A (hereinafter, Patent document 1) describes a package accommodating an optical semiconductor element connected to an optical fiber, and an optical module with a conductive lead extending toward the outside of the package. The optical module is mounted on a wiring substrate, which includes an opening at the position to which a bottom face of the package is firmly attached. A heat sink is tightly attached to the bottom face of the package through the opening.

SUMMARY

An object of the invention is to solve the problem above mentioned and to provide an optical module which achieves downsizing while maintaining heat dissipation power.

An optical module of the invention includes a chassis for housing an optical element and for including a hole that an optical fiber connects to, and a heat dissipation plate for including a cutout part. The plate is arranged on an upper part of the chassis. The optical fiber passes through the cutout part.

BRIEF DESCRIPTION OF THE DRAWINGS

Exemplary features and advantages of the present invention will become apparent from the following detailed description when taken with the accompanying drawings in which.

Figure 1:
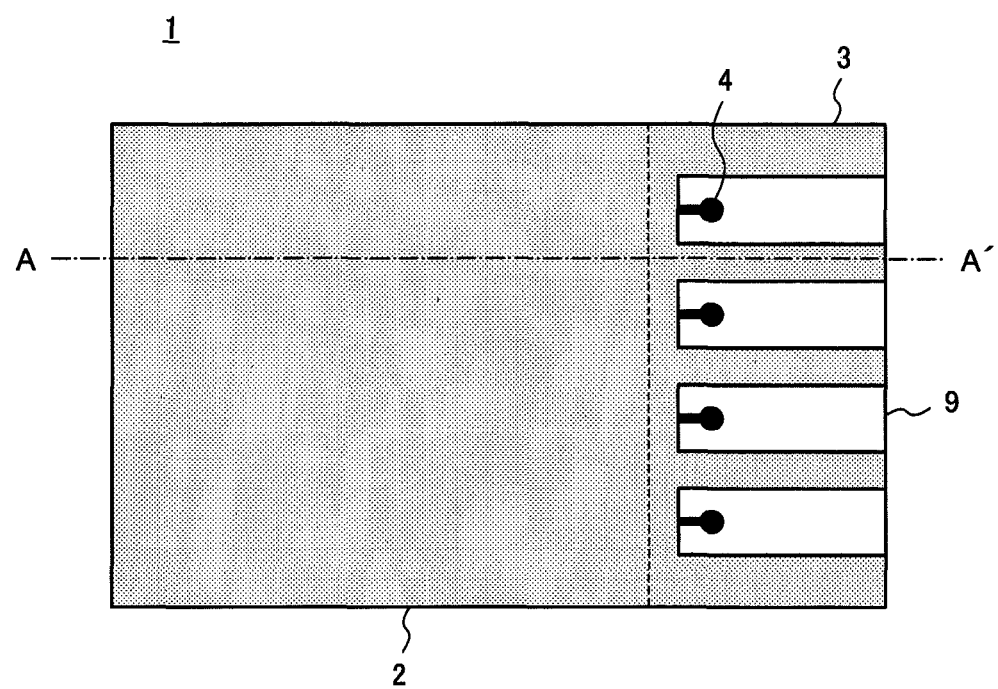
FIG. 1 is a top view of an optical module of a first embodiment.

EXPLANATION OF THE SYMBOLS 1 optical module
2 chassis
3 heat dissipation plate
4 optical fiber
5 substrate
6 light transmission module
7 light reception module
8 heat dissipation sheet
9 cutout part
10 enlarged part
11 substrate mounting an optical module
12 connection part
20 hole

EXEMPLARY EMBODIMENT

First Embodiment

Figure 2:
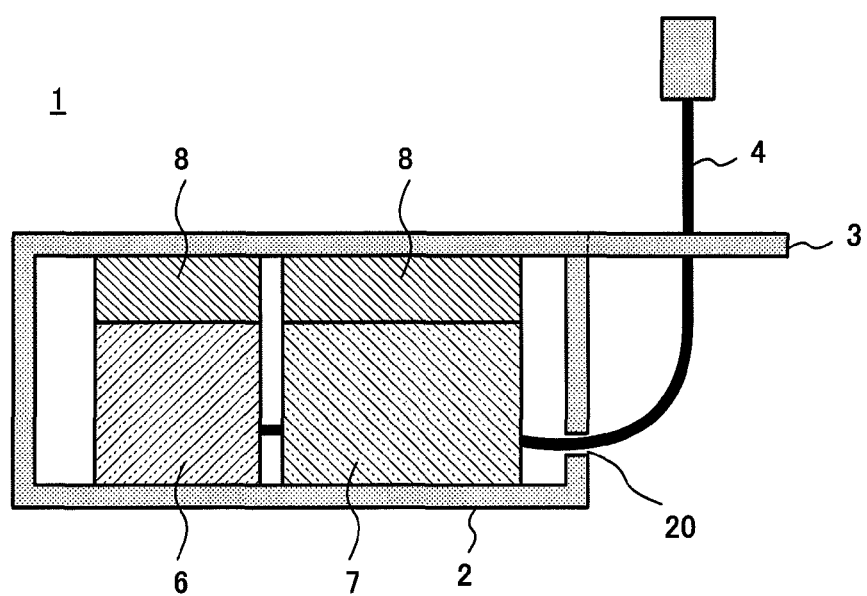
FIG. 2 is a sectional view of the optical module of the first embodiment.

Next, an embodiment is described in detail with reference to drawings. FIG. 1 is a top view of an optical module of a first embodiment, and FIG. 2 is a sectional view thereof. The sectional view of FIG. 2 is a cutaway view of FIG. 1 along the line A-A'.

[Explanation of Configuration]

As shown in FIG. 1 and FIG. 2, an optical module 1 includes a chassis 2, a heat dissipation plate 3 and an optical fiber 4.

The chassis 2 includes at least one of an optical transmission module 6 which is an optical semiconductor element, and an optical reception module 7 therein. FIG. 2 illustrates the chassis 2 having both of them. Each of optical transmission module 6 and the optical reception module 7 connects to the optical fiber 4. The optical transmission module 6 and the optical reception module 7 thermally connect to the chassis 2 through a heat dissipation sheet 8. That is, heat generated in the optical transmission module 6 and the optical reception module 7 transfers to the chassis 2 through the heat dissipation sheet 8.

The chassis 2 includes a hole 20 corresponding to section area of the optical fiber 4. The optical fiber 4 passes through the hole 20 and connects to each of the optical transmission module 6 and the optical reception module 7 arranged in the chassis 2.

The heat dissipation plate 3 may be arranged on a top face of the chassis 2, may be formed on the top face of the chassis 2 in an integrated manner, or may be screwed on the top face of the chassis 2 by using different material from that of the chassis 2. Any material with a high heat conduction rate may be employed for the heat dissipation plate 3 and the chassis 2. The same material or different ones may be employed as the material of the heat dissipation plate 3 and the chassis 2.

The heat dissipation plate 3 is larger than the chassis 2, and at least a part of the plate 3 extends outward from the chassis 2. The heat dissipation plate 3 includes a cutout part 9, width of which is larger than a diameter of the optical fiber 4.

It is desirable that the cutout part 9 arranged in the heat dissipation plate 3 and the hole 20 which is formed in the chassis 2 in order to pass the optical fiber 4 through are arranged in the same direction. That is, if the hole 20 of the chassis 2 and the cutout part 9 are arranged on the same side, the optical fiber 4 which passes through the hole 20 is easy to pass through the cutout part 9.

The optical fiber 4 connects to the optical transmission module 6 and the optical reception module 7 which are placed in the chassis 2. The optical fiber 4 which passes through the hole 20 to reach the outside of the chassis 2, curves toward the heat dissipation plate 3, passes through the cutout part 9, and connects to an optical connector and the like. As a result, the optical fiber 4 can be wired without contact with the cutout part 9.

[Explanation on Operation and Effect]

The optical semiconductor element, like the optical transmission module 6 or the optical reception module 7, which is arranged in the chassis 2, easily changes element characteristics thereof due to heat generation during operation. The optical semiconductor element thermally connects to the chassis 2 through the heat dissipation sheet 8, and performs heat dissipation through the heat dissipation plate 3.

Figure 3:
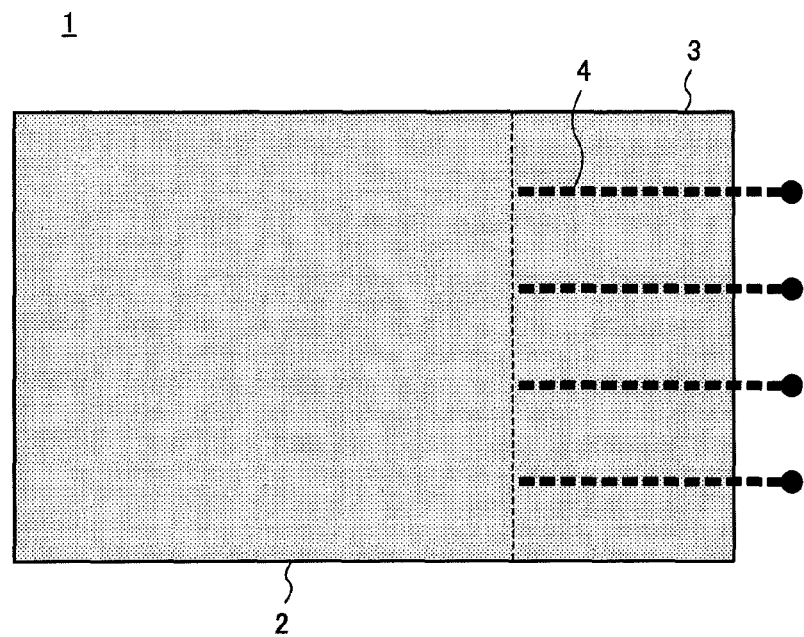
FIG. 3 is a top view of an optical module without a cutout part.
Figure 4:
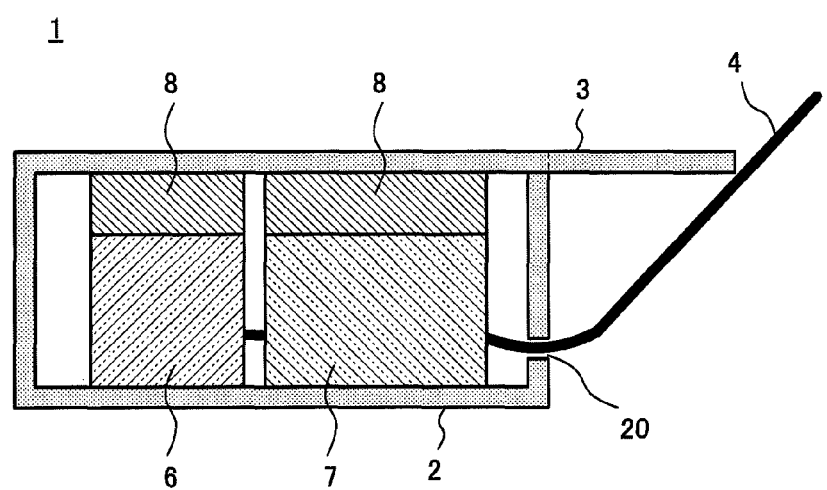
FIG. 4 is a sectional view of an optical module without a cutout part.

The heat dissipation plate 3 has to be enlarged in order to enhance heat dissipation performance with respect to heat generated in the optical transmission module 6 or the optical reception module 7. As shown in FIG. 3 and FIG. 4, however, if the heat dissipation plate 3 without the cutout part 9 is larger than the chassis 2, the problem is that the heat dissipation plate 3 comes in contact with the optical fiber when the optical fiber is fixed and removed, and the optical fiber is damaged.

If the heat dissipation plate 3 without the cutout part 9 is enlarged, it is required to detour the optical fiber significantly in order to prevent the optical fiber 4 coming in contact with the heat dissipation plate 3. Therefore, arrangement of the optical fiber 4 is restricted and downsizing of the apparatus becomes difficult.

In the embodiment, the heat dissipation plate 3 includes the cutout part 9, width of which is larger than the diameter of the optical fiber 4. Because of the above configuration, even if the heat dissipation plate 3 is enlarged in order to enhance heat dissipation performance, the optical fiber 4 can passes through the cutout part 9. It is not necessary to detour the optical fiber significantly in order to avoid the most outer side of the heat dissipation plate 3. In other words, the optical fiber 4 can be curved with small curvature radius and mounted.

As a result, adaptable arrangement for the optical fiber 4 becomes possible while avoiding damage due to contact with the heat dissipation plate 3, and downsizing of the apparatus is achieved.

Second Embodiment

Figure 5:
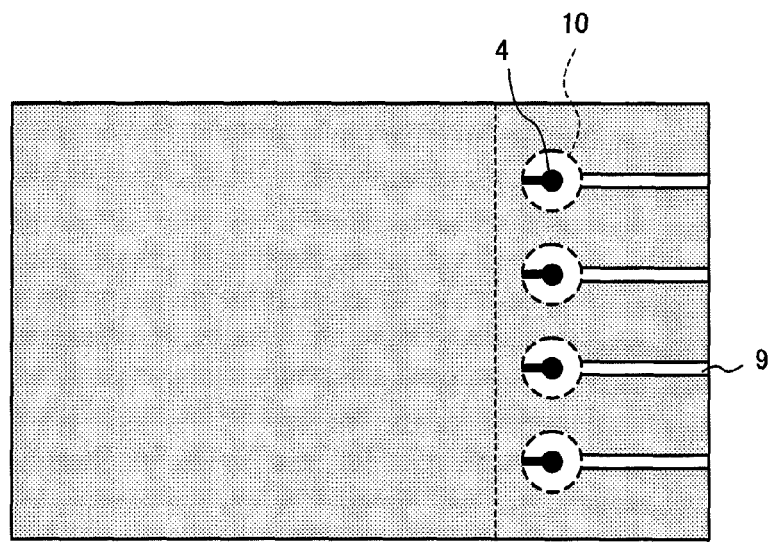
FIG. 5 is a top view of an optical module of a second embodiment.

Next, a second embodiment is described with reference to drawings. FIG. 5 is a sectional view of the optical module of the embodiment.

[Explanation of Configuration]

The second embodiment differs from the first embodiment in including an enlarged part 10 formed in the cutout part 9 of the heat dissipation plate 3 in the optical module 1. The other configuration and connection relation in the embodiment is the same as the first embodiment including the chassis 2, the heat dissipation plate 3 and the optical fiber 4.

The heat dissipation plate 3 may be arranged on a top face of the chassis 2, may be formed on the top face of the chassis 2 in an integrated manner, or may be screwed on the top face of the chassis 2 by using different material from that of the chassis 2. Any material with a high heat conduction rate may be employed for the heat dissipation plate 3 and the chassis 2. The same material or different one may be employed as the material of the heat dissipation plate 3 and the chassis 2.

The heat dissipation plate 3 is larger than section area of the chassis 2 and at least a part thereof projects outward from the chassis 2. The heat dissipation plate 3 includes the cutout part 9, at least a part of which includes the circular enlarged part 10. Width of the circular enlarged part 10 is larger than the diameter of the optical fiber 4. As shown in FIG. 5, the enlarged part 10 is located at the innermost part of the cutout part 9 in the heat dissipation plate 3.

It is desirable that the width of the cutout part 9 except the enlarged part 10 is smaller than the diameter of the optical fiber 4. The width, however, may be equal to or larger than the diameter of the optical fiber 4.

[Explanation of Operation and Effect]

The heat dissipation performance of the heat dissipation plate 3 depends on a size of surface area of the heat dissipation plate 3. If width of the entire cutout part 9 is larger than the diameter of the optical fiber 4 in order to avoid contact between the heat dissipation plate 3 and the optical fiber 4, the surface area of the heat dissipation plate 3 is decreased.

The heat dissipation plate 3 of the embodiment includes the circular enlarged part 10 which is larger than the diameter of the optical fiber 4 in a part of the cutout part 9. The optical fiber 4 passes through the enlarged part 10 of the cutout part 9 and connects to an optical connector or the like. Therefore, it is unnecessary to make the width of the cutout part 9 except the enlarged part 10 larger than the diameter of the optical fiber 4, and it is possible to ensure the surface area for heat dissipation.

As a result, downsizing of the apparatus is achieved and heat dissipation performance is enhanced. In the embodiment, the enlarged part 10 is formed at the innermost part of the cutout part 9. Otherwise, the enlarged part 10 may be formed at a halfway part of the cutout part 9.

Third Embodiment

Figure 6:
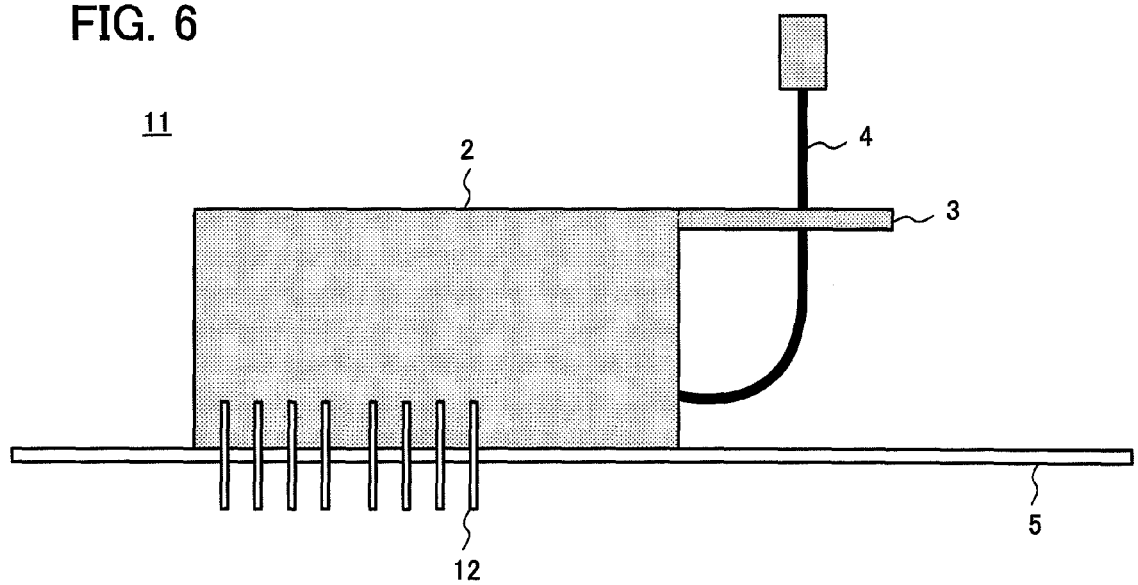
FIG. 6 is a side view of an optical module of a third embodiment.

Next, a third embodiment is described with reference to drawings. FIG. 6 is a side view of the optical module of the embodiment.

[Explanation of Configuration]

As shown in FIG. 6, the optical module 1 is mounted on a substrate 5 through a connection part 12 in the embodiment. A configuration and a connection relation of the optical module 1 in the embodiment are similar to these of the first embodiment. The optical module 1 of the embodiment includes the chassis 2, the heat dissipation plate 3 and the optical fiber 4.

The optical module 1 includes a plurality of lead-shaped connection parts 12 on both side faces of the chassis 2. Each of the connection parts 12 extends downward from the chassis 2. The connection parts 12 are inserted into through holes which are formed in the substrate 5 and face a under surface of the chassis 2. A connector may be employed as the connection parts.

[Explanation of Operation and Effect]

When downsizing of the optical module 1 proceeds, height of the chassis 2 becomes short. When the height of the chassis 2 becomes short, a top face of the chassis 2 and the heat dissipation plate 3 approaches to the substrate 5 gradually and distance between the heat dissipation plate 3 and the substrate 5 becomes short.

As shown in FIG. 3 and FIG. 4, if the distance between the heat dissipation plate 3 and the substrate 5 becomes short when the cutout part 9 is not formed in the heat dissipation plate 3, possibility that the optical fiber 4 comes in contact with the heat dissipation plate 3 and the optical fiber is damaged becomes higher.

In a substrate mounting the optical module 11 of the embodiment, since the heat dissipation plate 3 of the optical module 1 includes the cutout part 9, the optical fiber 4 can pass through the cutout part 9 even when the distance between the heat dissipation plate 3 and the substrate 5 becomes short.

Accordingly, it is possible to downsize the optical module and to secure quality of the optical fiber 4 by forming the cutout part 9 in the heat dissipation plate 3.

Heat sink is usually mounted on an optical module, that is, on the opposite side of a wiring substrate through the optical module. The heat sink is often configured to be larger than a module in order to enhance heat dissipation performance. When the optical fiber is brought upward from the optical module, that is, toward the heat sink, the optical fiber is required to pass outside the heat sink so that the optical fiber does not come in contact with the heat sink. As a result, it becomes difficult to arrange the optical fiber in a small space, and downsizing of the apparatus is not achieved.

In Patent document 1, the wiring substrate includes the opening, and the heat sink is larger than the optical module. Patent document 1 does not intend to bring the optical fiber through the opening. Even if the optical fiber is brought from the optical module toward the heat sink, the same problem above described occurs since the heat sink is larger than the optical module.

An exemplary advantage according to the invention is that the optical module of the invention achieves both heat dissipation performance and downsizing.

While the invention has been particularly shown and described with reference to exemplary embodiments thereof, the invention is not limited to these embodiments.

It will be understood by those of ordinary skill in the art that various changes in form and details may be made therein without departing from the spirit and scope of the present invention as defined by the claims.

The invention claimed is:

1. An optical module, comprising:
   a chassis for housing an optical element and for including a hole that connects to an optical fiber; and
   a heat dissipation plate for including a cutout part, the heat dissipation plate being arranged on an upper part of the chassis, wherein
   the optical fiber passes through the hole to reach outside of the chassis, curves towards the heat dissipation plate, and passes through the cutout part.

2. The optical module of claim 1, wherein
   width of the cutout part is larger than a diameter of the optical fiber.

3. An optical module, comprising:
   a chassis for housing an optical element and for including a hole that connects to an optical fiber; and
   a heat dissipation plate for including a cutout part, the heat dissipation plate being arranged on an upper part of the chassis, wherein
   the optical fiber passes through the cutout part, wherein
      the cutout part includes an enlarged part, width of which is larger than the diameter of the optical fiber, and
      the width of the cutout part except the enlarged part is smaller than the diameter of the optical fiber.

4. The optical module of claim 1, wherein the cutout part formed in the heat dissipation plate and the hole formed in the chassis are located on a same side of the chassis.

5. The optical module of claim 1, wherein the optical fiber is arranged without contact with the cutout part.

6. The optical module of claim 1, wherein
   the optical fiber is arranged so as to curve toward the cutout part.

7. The optical module of claim 1, wherein
   the heat dissipation plate and the chassis are formed in an integrated manner.

8. The optical module of claim 7, wherein
   the heat dissipation plate is made from a same material as the chassis.

9. The optical module of claim 1, wherein
   the heat dissipation plate is screwed on the chassis.

10. A substrate mounting an optical module, comprising:
    the optical module of claim 1 connecting to a substrate through a connection part.

11. The optical module of claim 1, wherein the heat dissipation plate is larger than the chassis, and at least a part of the heat dissipation plate extends outward from the chassis.

\* \* \* \* \*